(12) United States Patent
Ward et al.

(10) Patent No.: US 7,815,539 B2
(45) Date of Patent: Oct. 19, 2010

(54) PLANETARY TRANSMISSION

(75) Inventors: Peter Ward, Farmington Hills, MI (US);
Alexander Serkh, Troy, MI (US);
Corrado Iotti, Modena (IT)

(73) Assignee: The Gates Corporation, Denver, CO (US)

( * ) Notice: Subject to any disclaimer, the term of this patent is extended or adjusted under 35 U.S.C. 154(b) by 430 days.

(21) Appl. No.: 12/072,662

(22) Filed: Feb. 27, 2008

(65) Prior Publication Data

US 2009/0215577 A1 Aug. 27, 2009

(51) Int. Cl.
*F16H 3/74* (2006.01)
(52) U.S. Cl. ...................................... 475/259; 475/261
(58) Field of Classification Search ................. 475/258, 475/259, 261, 262
See application file for complete search history.

(56) References Cited

U.S. PATENT DOCUMENTS

| | | | | |
|---|---|---|---|---|
| 2,392,947 | A * | 1/1946 | Reed | 192/105 C |
| 3,088,339 | A * | 5/1963 | Black | 477/121 |
| 4,674,612 | A | 6/1987 | Ogura | 192/48.92 |
| 4,827,799 | A | 5/1989 | Jang | 74/752 E |
| 4,881,453 | A | 11/1989 | Armstrong | 92/84 |
| 5,263,906 | A * | 11/1993 | Antonov | 475/257 |
| 5,409,428 | A | 4/1995 | Antonov | 475/258 |
| 5,733,217 | A | 3/1998 | Naraki et al. | 475/258 |
| 6,375,592 | B1 * | 4/2002 | Takahashi et al. | 475/262 |
| 6,422,371 | B1 | 7/2002 | Naraki et al. | 192/105 C |
| 6,910,453 | B2 * | 6/2005 | Sugino et al. | 123/179.28 |

FOREIGN PATENT DOCUMENTS

| | | |
|---|---|---|
| DE | 29 51 971 A1 | 2/1981 |
| JP | 60220245 | 2/1985 |

OTHER PUBLICATIONS

Notification of Transmittal of the International Search Report and the Written Opinion of the International Searching Authority, or the Declaration, International Application No. PCT/US2009/001023 Mailed Jun. 4, 2009.

* cited by examiner

*Primary Examiner*—Ha D. Ho
(74) *Attorney, Agent, or Firm*—J. A. Thurnau, Esq.; P. N. Dunlap, Esq.

(57) ABSTRACT

A planetary transmission comprising an input member, an output member, a planetary gear assembly mechanically disposed between the input member and the output member, a centrifugal clutch mechanically disposed between the input member and the output member, a one-way clutch mechanically disposed between the input member and the output member, the one-way clutch for directly coupling the input member and the output member from zero rotational speed up to a first rotational speed, the centrifugal clutch for directly coupling the input member and the output member from a second rotational speed greater than zero rotational speed to a third rotational speed which is in excess of the first rotational speed, and a brake member for selectively controlling rotation of the planetary gear assembly.

7 Claims, 7 Drawing Sheets

_PLANETARY TRANSMISSION_

FIELD OF THE INVENTION

The invention relates to a planetary transmission, and more particularly to a planetary transmission having a centrifugal clutch and a one-way clutch for selectively directly coupling an input member and an output member.

BACKGROUND OF THE INVENTION

Switchable planetary transmissions are intended to provide adequate speed to accessory assemblies, such as an air conditioner compressor, alternator, steering pump or any other kind of auxiliary at engine idling speeds without causing those assemblies to race out of specification at high engine speeds, which may cause damage. This makes it possible to guarantee the operation of the vehicle electrical system, steering system or AC system even if the accessory assembly size might be reduced. Reduced accessory speed at high engine revs leads to lower power losses giving higher maximum performance.

Representative of the art is U.S. Pat. No. 4,827,799 which discloses an infinitely variable planetary transmission is used in a vehicle, such as motorcycle and remote-control model car. The transmission includes a driven shaft journalled within the end bore of an input shaft. A sun gear is sleeved rigidly on the driven shaft. A planet gear carrier is sleeved rotatably on the driven shaft and serves as a power output member. A first centrifugal clutch is interposed between a ring gear and the input shaft so that, when the rotational speed of the input shaft is increased, the ring gear rotates synchronously with the input shaft. A set of planet gears are mounted rotatably on the carrier and meshed with the ring and sun gears. A second centrifugal clutch includes friction shoes mounted on the carrier, and a rim clutch sleeved rigidly on the driven shaft. A uni-directional bearing limits the driven shaft to rotate only in the same direction as the input shaft. When the input shaft rotates at a low speed, the sun gear is fixed by the limiting action of the unidirectional bearing so that the rotational speed ratio of the carrier to the input shaft is low. When the input shaft rotates at a high speed, the second centrifugal clutch interengages the carrier and the driven shaft so that the ring and sun gears rotate in the same direction, achieving a high rotational speed ratio of the carrier to the input shaft.

What is needed is a planetary transmission having a centrifugal clutch and a one-way clutch for selectively directly coupling an input member and an output member. The present invention meets this need.

SUMMARY OF THE INVENTION

The primary aspect of the invention is to provide a planetary transmission having a centrifugal clutch and a one-way clutch for selectively directly coupling an input member and an output member.

Other aspects of the invention will be pointed out or made obvious by the following description of the invention and the accompanying drawings.

The invention comprises a planetary transmission comprising an input member, an output member, a planetary gear assembly mechanically disposed between the input member and the output member, a centrifugal clutch mechanically disposed between the input member and the output member, a one-way clutch mechanically disposed between the input member and the output member, the one-way clutch for directly coupling the input member and the output member from zero rotational speed up to a first rotational speed, the centrifugal clutch for directly coupling the input member and the output member from a second rotational speed greater than zero rotational speed to a third rotational speed which is in excess of the first rotational speed, and a brake member for selectively controlling rotation of the planetary gear assembly.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION

Figure 1:
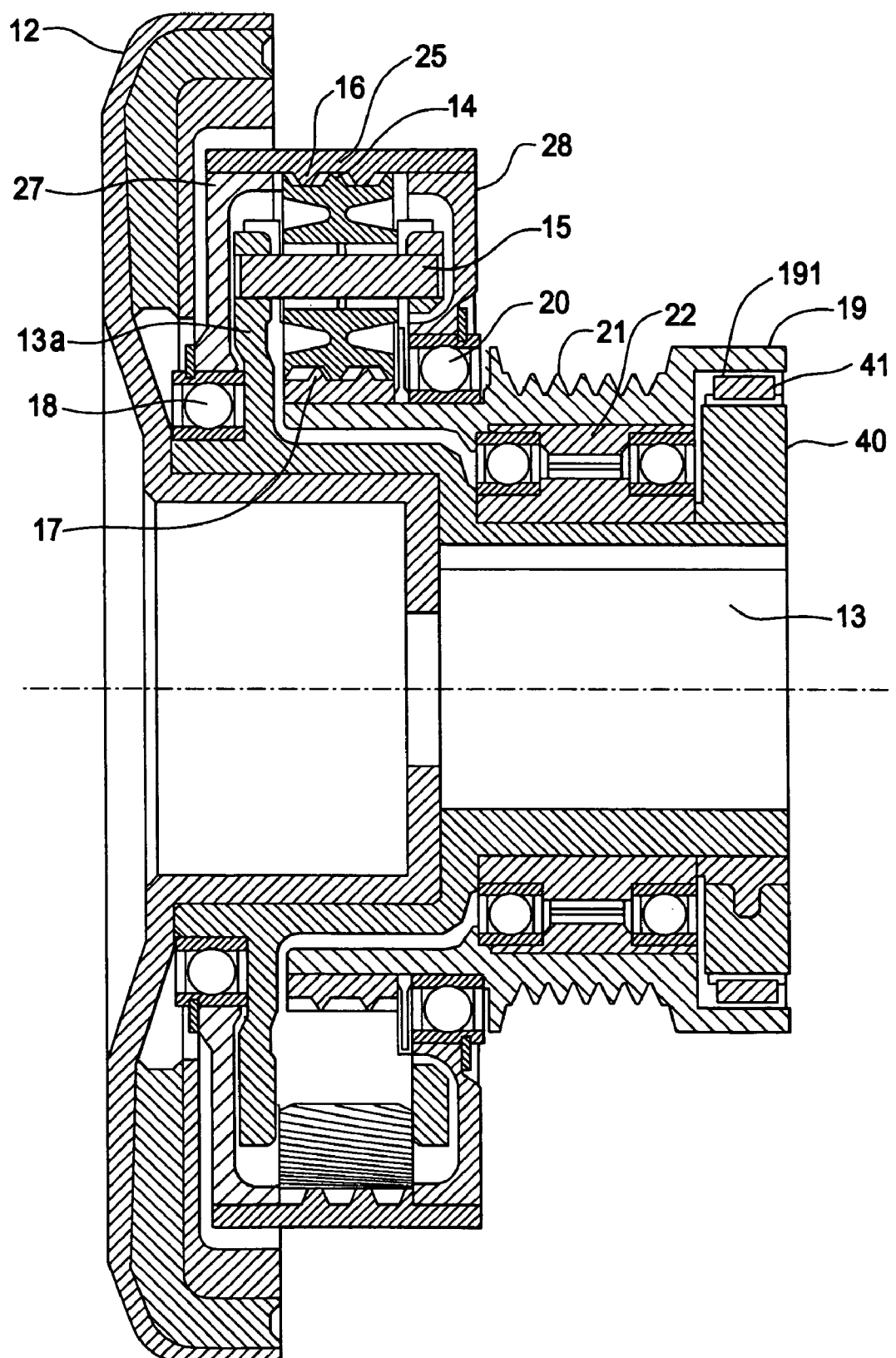
FIG. 1 is a cross sectional view of the transmission.

FIG. 1 is a cross sectional view of the transmission. Transmission 100 is a compact unit which is installed on the end of an internal combustion engine crankshaft.

Transmission 100 comprises input member 13. Input member 13 is connected to an engine crankshaft using a bolt 11. Inertial member 12 is connected to input member 13.

Input member 13 further comprises a carrier member 13a. Input member 13, inertial member 12 and carrier member 13a are connected to form an input assembly. Carrier member 13a is a portion of input member 13.

Disposed about carrier member 13a is a plurality of planetary gears 14. Each planetary gear 14 rotates about a spindle 15.

Disposed radially outward from the carrier member 13a is ring gear 16. Each planetary gear 14 engages ring gear 16 and sun gear 17.

Ring gear 16 rotates about carrier member 13a on bearing 18 and upon output member 19 on bearing 20.

Carrier member 13a, planetary gears 14, spindles 15, and ring gear 16 comprise the planetary gear assembly.

Brake member band brake band 24 engages surface 25 of ring gear 16. Band brake may comprise one known in the art. For example, the band brake disclosed in U.S. Pat. No. 4,881, 453 which is incorporated herein by reference in its entirety.

Sun gear 17 is disposed on output member 19.

Output member 19 comprises a belt bearing surface 21. Belt bearing surface may have any required profile including multi-ribbed as shown.

One-way clutch 22 is disposed directly between input member 13 and output member 19. This arrangement does not decouple carrier 13a from crankshaft (CRK) as is taught in the prior art.

Centrifugal clutch 40 is press fit onto input member 13. Friction rim 41 engages an inner surface 191 of output member 19.

Portions 27 and 28 prevent debris from entering the transmission, and also provide structural support.

The inventive transmission has two operating modes. The first is when the band brake is not engaged. The second is when the band brake is engaged.

First Operating Mode

In the first operating mode, a crankshaft (not shown) rotates input member 13, and therefore carrier member 13a. Inertial member 12 is slaved to the input member 13 and will not be further described.

Since the centrifugal clutch 40 is not engaged and the band brake is not engaged, ring gear 16 is free to rotate.

In this mode one-way clutch 22 is engaged, therefore causing output member 19 to rotate in unison with and at the same speed as input member 13.

In this mode for engine speeds up to approximately 4300 RPM the output member is driven by the one-way clutch 22. For speeds exceeding approximately 4300 RPM the centrifugal clutch is engaged with the output member 19 and the one-way clutch is disengaged due to the centripetal effects on the roller pins, see FIG. 7.

In the first operating mode the torque flow is from input member 13, (and for speeds less than ~4300 RPM) directly through one-way clutch 22 and then through output member 19 to a belt (not shown), (and for speeds greater than ~4300 RPM) directly through the centrifugal clutch 40 and then through output member 19 to a belt.

Second Operating Mode

In the second operating mode band brake 24 is engaged. This prevents ring gear 16 from rotating. When ring gear 16 is locked, rotation of carrier member 13a causes each planetary gear 14 to rotate about each respective spindle 15. Rotation of each planetary gear 14 causes sun gear 17 to be driven in the same rotational direction as the input member 13, but at a greater speed having a ratio of approximately 2:1. Since sun gear 17 and output member 19 are being driven at a greater speed than input member 13, one-way clutch 22 is overridden and disengages.

In the second operating mode the torque flow is from input member 13 (and thereby through carrier member 13a) through planetary gears 14, through sun gear 17 to output carrier 19. Since one-way clutch 22 and centrifugal clutch 40 are disengaged, there is no torque transmitted through one-way clutch 22 or centrifugal clutch 40.

Figure 2:
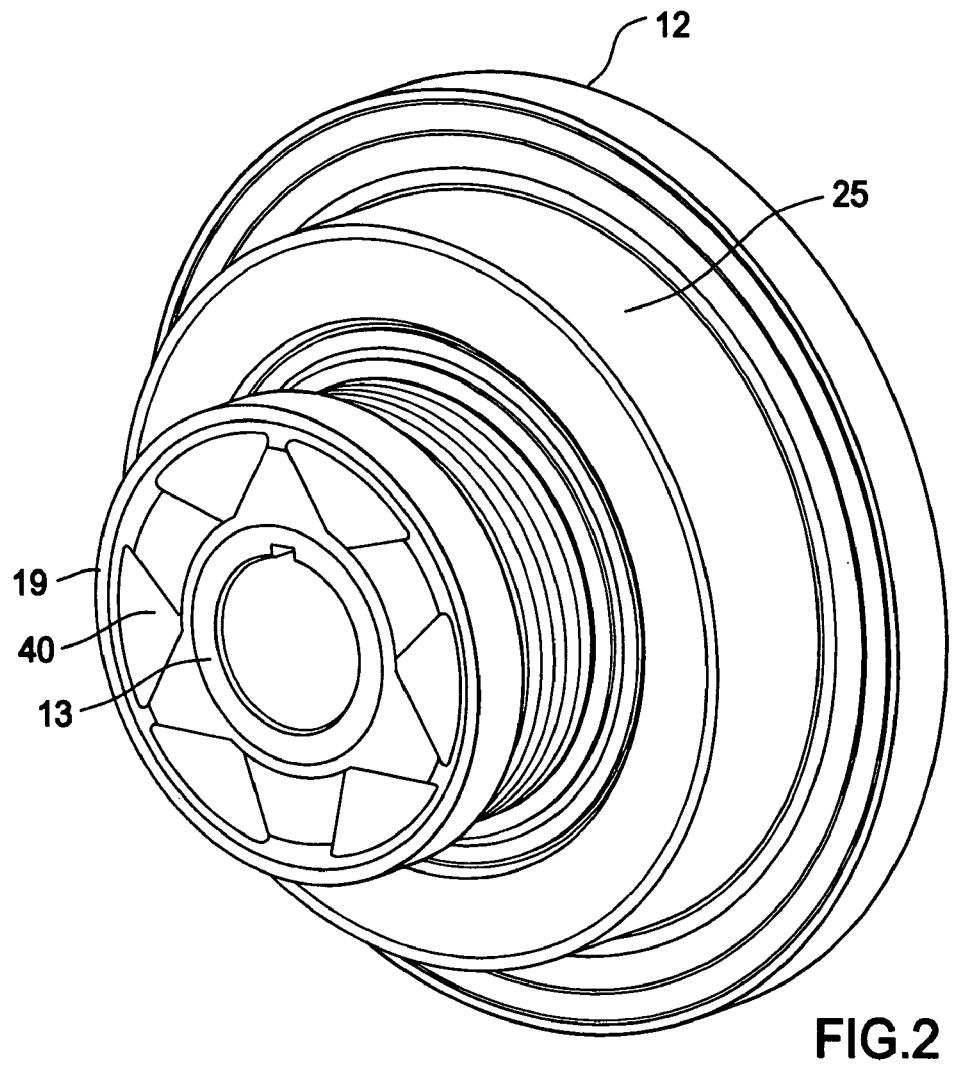
FIG. 2 is a rear perspective view of the transmission.

FIG. 2 is a rear perspective view of the transmission. Centrifugal clutch 40 is disposed between input member 13 and output member 19.

Figure 3:
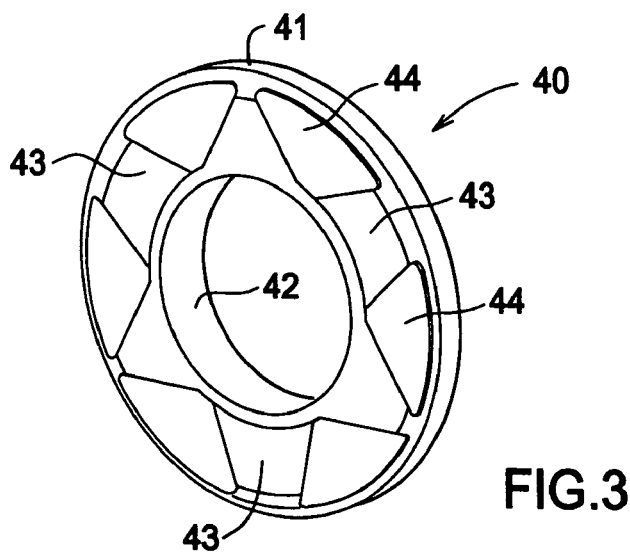
FIG. 3 is a front perspective view of the centrifugal clutch.

FIG. 3 is a front perspective view of the centrifugal clutch. Clutch 40 comprises stretchable friction ring 41 and inner ring 42. Disposed between friction ring 41 and inner ring 42 are weights 43 and frictional elements 44. Inner ring 42 comprises a guide 420 for locating guiding and retaining weights 43 and elements 44.

Friction ring 41 comprises a stretchable elastomeric material. For example, suitable materials may comprise EPDM rubber having a tensile modulus of approximately 30N to 50N at approximately 2% to approximately 4% elongation and with a coefficient of friction (COF) approximately 1.5 to approximately 3.0. This material would have a temperature performance range of approximately −45° C. to approximately 160° C.

Another suitable material comprises high temperature HNBR. In addition to providing the given modulus and COF of EPDM, HNBR also provides oil resistance and has a temperature range of approximately −25° C. to approximately +160° C.

High temperature urethane is the third available material. The urethane COF range is approximately 2.0 to approximately 3.0, while providing good oil resistance and temperature resistance equivalent to HNBR.

Figure 4:
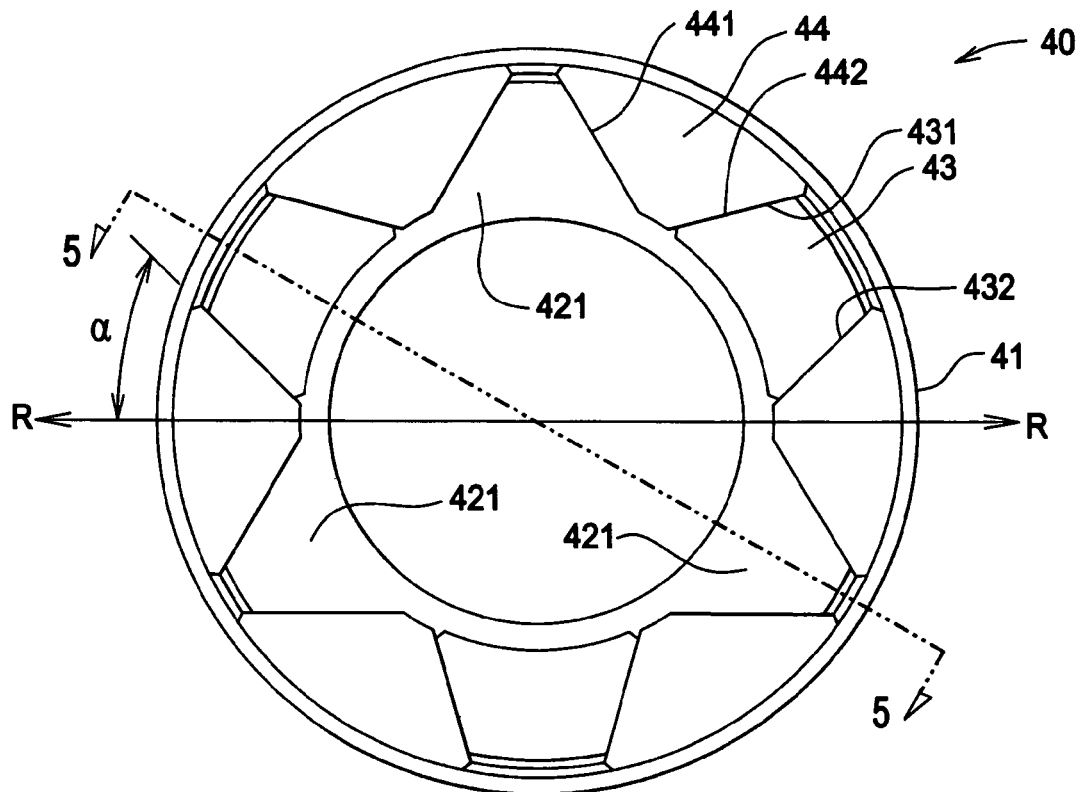
FIG. 4 is a front elevation view of the centrifugal clutch.

FIG. 4 is a front elevation view of the centrifugal clutch. Sides 441 and 442 of elements 44 comprise an angular offset from a radius R. Sides 431 and 432 of weights 43 comprise an angular relation α from a radius R. Sides 442 slidingly engage sides 431. Sides 441 slidingly engage sides 432.

The angular relation of sides 431, 432, 441, 442 assure that weights 43 and elements 44 remain in contact as weights 43 and elements 44 move radially outward as clutch 40 spins.

Inner ring 42 comprises radially projecting members 420. Members 421 hold weights 43 and elements 44 in proper relation so that torque may be transmitted from inner ring 42, to members 421 through elements 44 to the friction ring 41 and therefrom to output member 19.

By way of example and not of limitation, each weight 43 weighs approximately 17 gm and each element 44 weighs approximately 7 gm.

Figure 5:
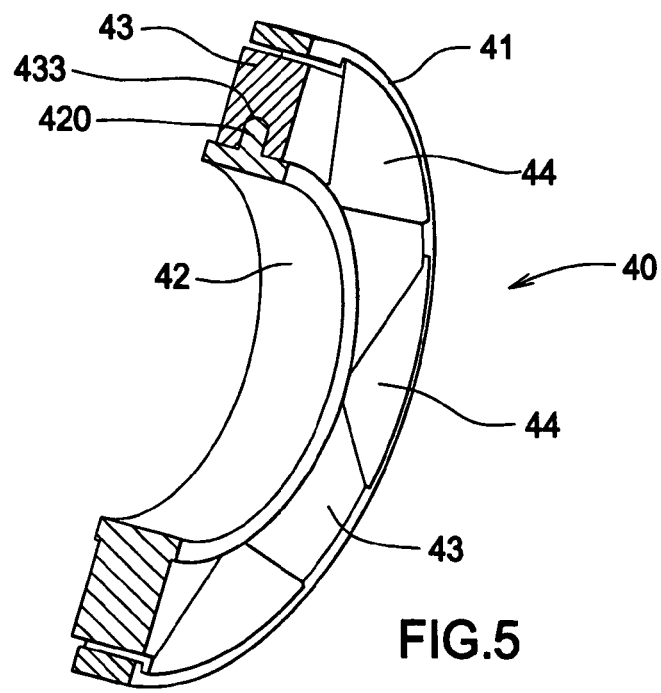
FIG. 5 is section 5-5 from FIG. 4.

FIG. 5 is section 5-5 from FIG. 4. Guide 420 radially projects from inner ring 42. Each weight 43 and element 44 is engaged with guide 420 by a groove 433 (for weight 43) and groove 443 (for element 44).

In operation the centrifugal force generated by the mass of each weight 43 and element 44 forces each to move radially outwardly against the friction ring 41. As the rotational speed increases the force exerted by each weight and element also increases. This increases the normal force exerted by the friction ring 41 on the inner surface 191 of output member 19. The frictional force is the product of the normal force and the coefficient of friction.

Figure 6:
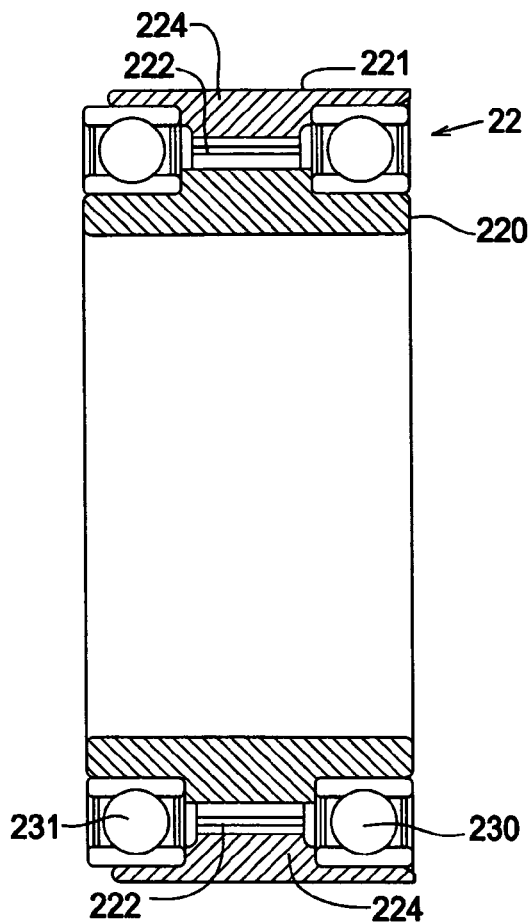
FIG. 6 is a cross sectional view of the roller clutch.

FIG. 6 is a cross sectional view of the roller (one-way) clutch. Clutch 22 comprises an inner race 220, an outer race 221, a bearing 230 and bearing 231. Bearings 230 and 231 are ball bearings. Inner race 220 is press fit on input member 13.

Figure 7:
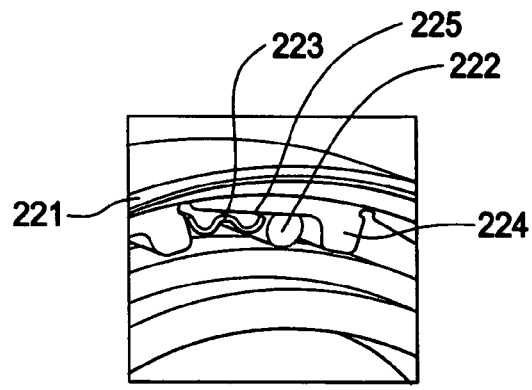
FIG. 7 is a detail of the roller clutch.

FIG. 7 is a detail of the roller clutch. Clutch 22 comprises outer race 221. Outer race 221 comprises tangs 224 which extend radially inward toward inner race 220, but do not contact inner race 220. Also included is an inclined surface 225. Roller 222 is disposed between the inclined surface 225 and inner race 220. A spring member 223 presses against roller 222 with a predetermined force.

Inclined surface 225 has a slight divergent angular separation from a tangent taken with relation to the inner race at the point where roller 22 contacts the inner race. This has the effect of establishing an acute angle between the inclined surface 225 and the tangent to the inner race.

In operation the convergent nature of inclined surface 225 and inner race 220 causes roller 222 to be locked or "trapped" therebetween, causing the inner race 220 and outer race 221 to rotate in locked fashion. When the inner race is rotated in the opposite direction, or, when the outer race is rotated faster than the inner race, the divergent nature of the inclined surface 225 and inner race causes rollers 222 to be disengaged, thereby prevent a transfer of torque between the inner and outer races. FIG. 7 is a detail representing a plurality of such components in the one-way clutch 22.

The torque capacity of the one-way clutch is approximately 200 N. The position of each roller is a function of its centrifugal force.

$$F = mv^2/r \, N$$

Where F is the centrifugal force
m is the mass of the roller in kg
v is the tangential velocity in m/sec
r is the radius in meters
N is Newtons At a predetermined speed, based upon the mass of each roller, the rotational speed of the clutch, and the spring rate of spring 223, each roller will begin to move radially outwardly along the inclined surface. This will ultimately cause each roller to disengage from the inner race, thereby causing the inner race to disengage from the outer race. This stops all torque transmission between the inner race and the outer race.

Figure 8:
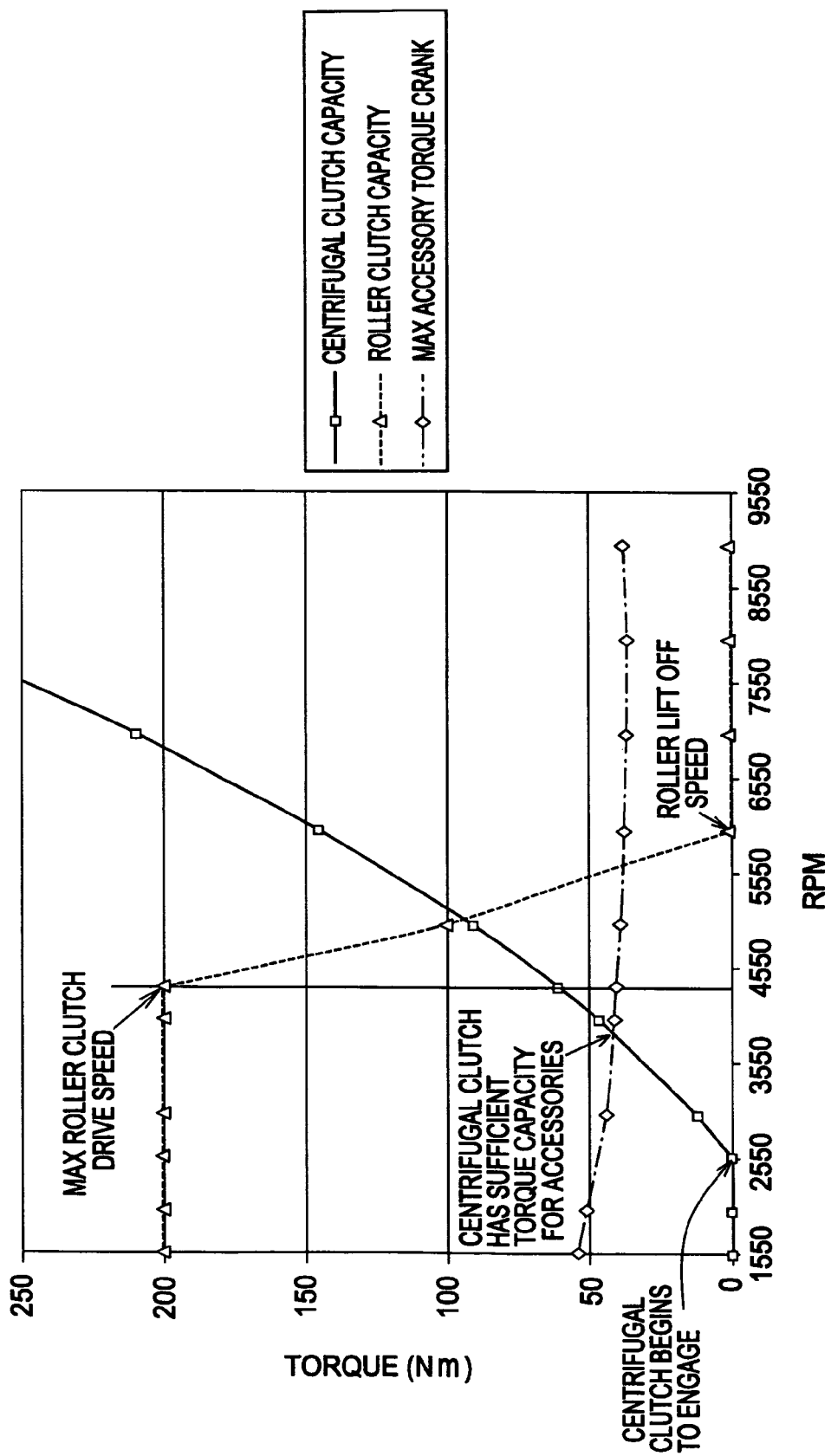
FIG. 8 is a chart showing transmission torque as a function of engine RPM.

FIG. 8 is a chart showing transmission torque as a function of engine RPM. The chart shows that at approximately 4300 RPM the one-way roller clutch 22 begins to disengage as described for FIG. 7. Simultaneously, the centrifugal clutch 40 begins to engage. At approximately 6000 RPM each roller 222 is fully disengaged, thereby disengaging the one-way clutch 22. At the same time the centrifugal clutch 40 is developing greater amounts of frictional force between the friction ring 41 and inner surface 191. As a result the centrifugal clutch is able to progressively increase the amount of torque transmitted from the input member 13 across clutch 40 to the output member 19.

Figure 9:
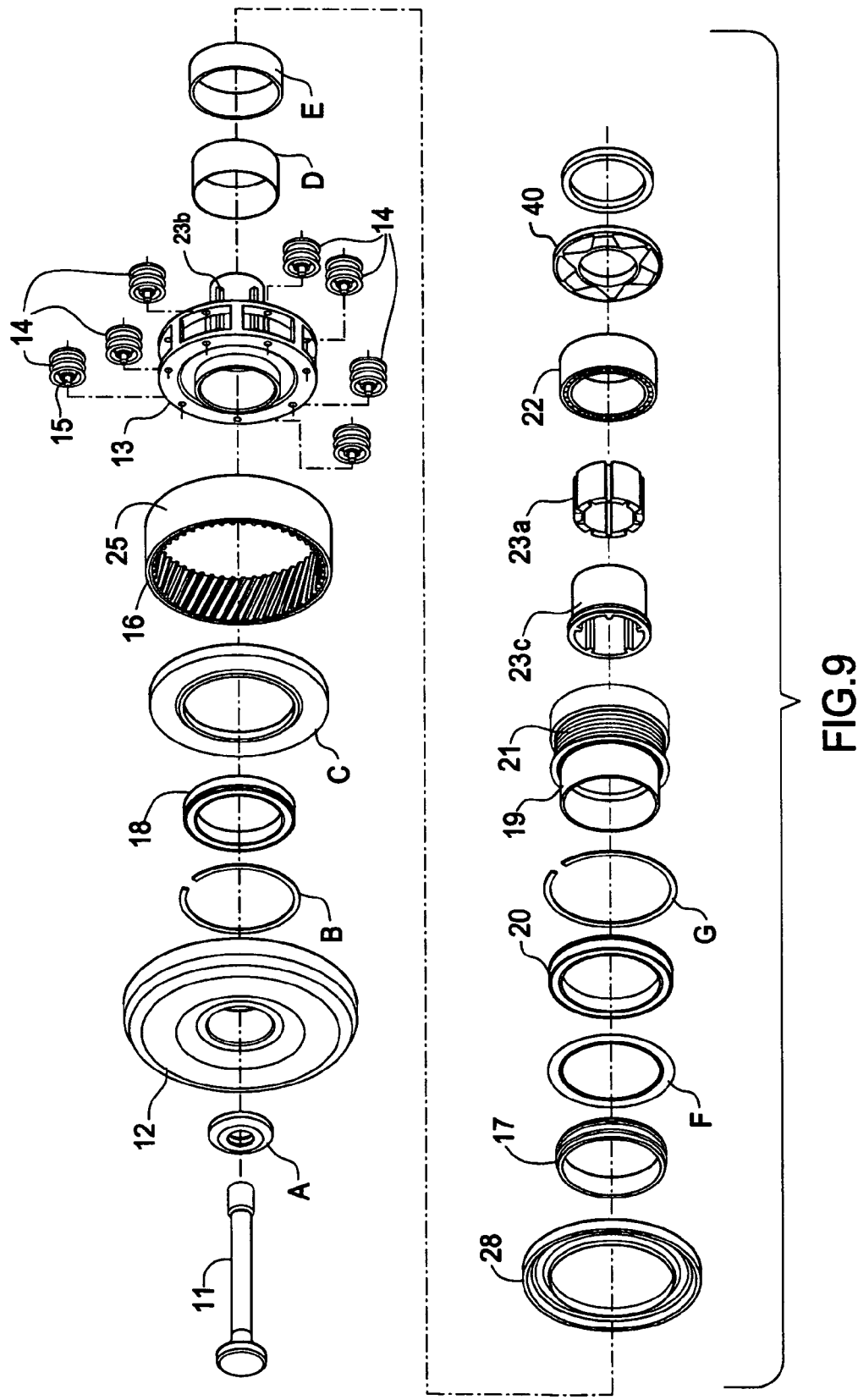
FIG. 9 is an exploded perspective view.

FIG. 9 is an exploded perspective view.

Figure 10:
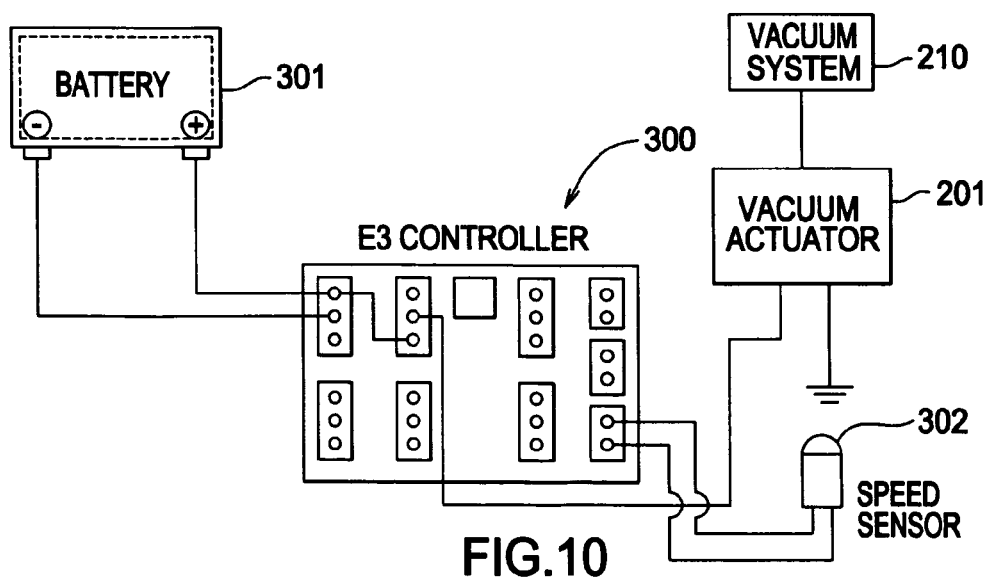
FIG. 10 is a schematic of the control system for the transmission.

FIG. 10 is a schematic of the control system for the transmission. Vacuum actuator 201 is connected to a vehicle vacuum system 210. Vacuum actuator is also connected to E3 controller 300, known in the art. E3 controller 300 is connected to a vehicle battery 301.

Speed sensor 302 provides an engine speed signal to the E3 controller. The E3 controller can be programmed to actuate the vacuum actuator 201 based upon predetermined engine speeds. For example, at engine idle the band brake is "ON" and therefore the vacuum actuator is "ON" and the band 24 is engaged with surface 25. This stops rotation of ring gear 16. This causes the output member 19 to rotate at a speed greater than the speed of input member 13. This in turn causes the accessories to be driven at an appropriate speed at engine idle. Engine idle is typically ~700 RPM to 900 RPM. The transmission ratio is typically in the range of approximately 2:1.

At speeds greater that ~2000 RPM the vacuum actuator is "OFF" which allows ring gear 16 to rotate. The engine speed signal is from speed sensor 302. Rotation of ring gear 16 causes output member 19 to rotate at the same speed as the input member 13. However, due to the smaller radius of output member 19, the accessories are driven at a normally slower speed, thereby reducing the amount of power normally required to run the accessories at higher engine speeds. The diameter of output member 19 is typically ~90 mm. By comparison, the typical diameter of a crankshaft pulley is in the range of approximately 150 mm to 175 mm.

Figure 11:
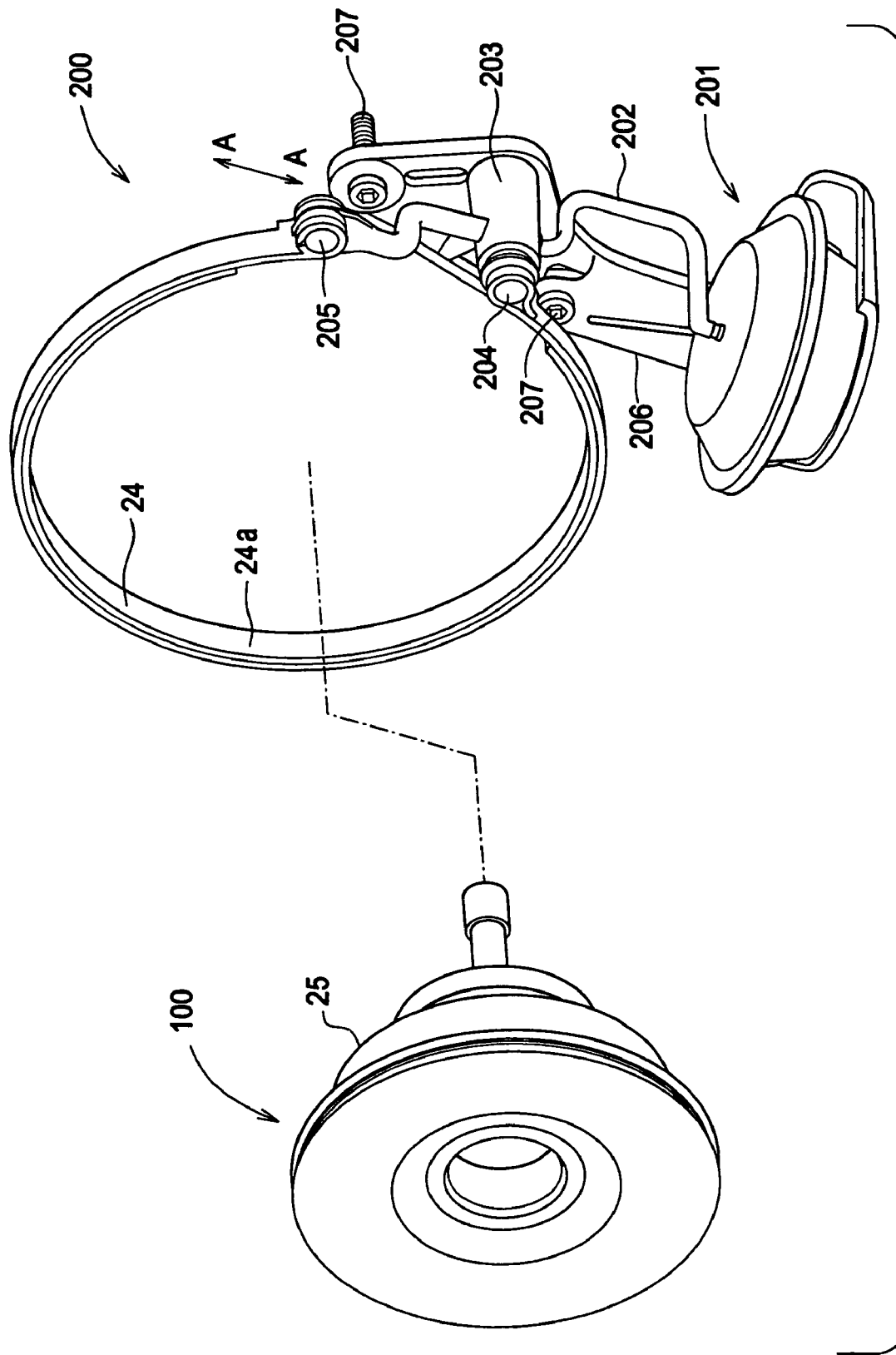
FIG. 11 is a perspective view of the transmission and the band brake.

FIG. 11 is a perspective view of the transmission and the band brake. Band 24 of band brake 200 engages surface 25 of ring gear 16. Band comprises friction material 24a.

Band brake 200 is operated by a vacuum actuator 201. Vacuum actuator 201 is connected to band 24 by linkage 202. Linkage 202 is guided by guide member 203. Guide member 203 restricts linkage 202 such that linkage 202 moves in a substantially linear direction along its major axis A-A. Band 24 is connected at a first pivot 204 to the base 206. Band 24 is connected to a second pivot 205 on an end of linkage 202.

Linear movement of linkage 202 causes second pivot 205 to tightly engage surface 25. Without guide member 203 second pivot 205 can be pushed radially outward by surface 25 during operation, which in turn can diminish the effectiveness of the band brake.

Base 206 of band brake 200 is mounted to a mounting surface, such as an engine, using bolts 207.

Vacuum actuator 201 is connected to a vehicle vacuum system and is controlled based upon the engine speed.

Although forms of the invention has been described herein, it will be obvious to those skilled in the art that variations may be made in the construction and relation of parts and method without departing from the spirit and scope of the invention described herein.

We claim:

1. A planetary transmission comprising:
   an input member;
   an output member;
   a planetary gear assembly mechanically disposed between the input member and the output member;
   a centrifugal clutch mechanically disposed between the input member and the output member;
   a one-way clutch mechanically disposed between the input member and the output member;
   the one-way clutch for directly coupling the input member and the output member from zero rotational speed up to a first rotational speed;
   the centrifugal clutch for directly coupling the input member and the output member from a second rotational speed greater than zero rotational speed to a third rotational speed which is in excess of the first rotational speed; and
   a brake member for selectively controlling rotation of the planetary gear assembly.

2. The planetary transmission as in claim 1 further comprising a sun gear disposed on the output member.

3. The planetary transmission as in claim 1, wherein the planetary gear assembly comprises a ring gear, the ring gear stoppable by the brake member.

4. The planetary transmission as in claim 1, wherein the centrifugal clutch comprises:
   a first mass and a second mass, each mass is moveable radially outward from an axis of rotation;
   a friction member comprising a stretchable material and having a circular shape; and
   the first mass and the second mass urging the friction member radially outward as the centrifugal clutch rotates.

5. The planetary transmission as in claim 1 further comprising an inertial member fixedly connected to the input member.

6. The planetary transmission as in claim 1, wherein the brake member comprises a band brake.

7. The planetary transmission as in claim 6, wherein the band brake is vacuum actuated.

* * * * *